(12) United States Patent
Chen et al.

(10) Patent No.: US 8,996,186 B2
(45) Date of Patent: Mar. 31, 2015

(54) SYSTEM AND METHOD FOR MANAGING POWER CONSUMPTION

(75) Inventors: Wei-Peng Chen, Fremont, CA (US); Koji Yoshimura, Tokyo (JP); Ryusuke Masuoka, San Jose, CA (US); Sung Lee, Palo alto, CA (US)

(73) Assignee: Fujitsu Limited, Kawasaki-shi (JP)

( * ) Notice: Subject to any disclaimer, the term of this patent is extended or adjusted under 35 U.S.C. 154(b) by 524 days.

(21) Appl. No.: 13/372,592

(22) Filed: Feb. 14, 2012

(65) Prior Publication Data
US 2012/0316687 A1    Dec. 13, 2012

Related U.S. Application Data

(60) Provisional application No. 61/494,069, filed on Jun. 7, 2011.

(51) Int. Cl.
G05D 3/12 (2006.01)
G05D 5/00 (2006.01)
G05D 9/00 (2006.01)
(Continued)

(52) U.S. Cl.
CPC . *H02J 3/14* (2013.01); *H02J 3/008* (2013.01); *H02J 2003/143* (2013.01); *H02J 2003/146* (2013.01); *Y02B 70/3225* (2013.01); *Y02B 70/3266* (2013.01); *Y04S 20/222* (2013.01); *Y04S20/224* (2013.01); *Y04S 20/242* (2013.01); *Y04S 50/10* (2013.01)
USPC ............. 700/291; 700/22; 700/286; 700/295; 700/297

(58) Field of Classification Search
CPC ....... H02J 3/008; H02J 3/14; H02J 2003/143; H02J 2003/146; Y04S 50/10; Y04S 20/222; Y04S 20/224; Y04S 20/242; Y02B 70/3266; Y02B 70/3225

USPC ................... 700/22, 286, 291–293, 295, 297
See application file for complete search history.

(56) References Cited

U.S. PATENT DOCUMENTS 5,924,486 A * 7/1999 Ehlers et al. ................... 165/238
6,580,950 B1 * 6/2003 Johnson et al. .................. 700/17
(Continued)

FOREIGN PATENT DOCUMENTS

WO   WO 03/056882 A1   7/2003   ............. H05B 37/00
WO   WO 2010/092510 A1   8/2010   ............. H04L 12/28

OTHER PUBLICATIONS

Notification of Transmittal of the International Search Report and the Written Opinion of the International Searching Authority, or the Declaration; International Application No. PCT/US2012/040661; International Filing Date: Jun. 4, 2012, Date of Mailing Oct. 18, 2012.

*Primary Examiner* — Ramesh Patel
(74) *Attorney, Agent, or Firm* — Baker Botts L.L.P.

(57) ABSTRACT

In accordance with a particular embodiment, a method for managing power consumption includes receiving power rate information and receiving power usage information. The method also includes receiving a plurality of personal preference profiles. Each personal preference profile of the plurality of personal preference profiles is associated with a different user of a plurality of users and includes at least one preferred state associated with a respective user. The method further includes detecting a presence of at least one user within a room. The method additionally includes adjusting at least one state associated with the room based on the at least one preferred state associated with the at least one user within the room, the power rate information, and the power usage information.

21 Claims, 3 Drawing Sheets

(51) Int. Cl.
  *G05D 11/00* (2006.01)
  *G05D 17/00* (2006.01)
  *H02J 3/14* (2006.01)
  *H02J 3/00* (2006.01)
  *G05B 11/01* (2006.01)

(56) References Cited

U.S. PATENT DOCUMENTS

| | | | |
|---|---|---|---|
| 7,222,800 B2* | 5/2007 | Wruck | 236/51 |
| 8,620,476 B2* | 12/2013 | Lee et al. | 700/276 |
| 2004/0267408 A1* | 12/2004 | Kramer | 700/291 |
| 2008/0272934 A1* | 11/2008 | Wang et al. | 340/870.11 |
| 2009/0187499 A1* | 7/2009 | Mulder et al. | 705/30 |
| 2009/0195349 A1* | 8/2009 | Frader-Thompson et al. | 340/3.1 |
| 2010/0156665 A1* | 6/2010 | Krzyzanowski et al. | 340/870.02 |
| 2010/0261465 A1* | 10/2010 | Rhoads et al. | 455/420 |
| 2011/0022242 A1* | 1/2011 | Bukhin et al. | 700/291 |
| 2011/0202181 A1* | 8/2011 | Lee et al. | 700/276 |
| 2011/0231020 A1* | 9/2011 | Ramachandran et al. | 700/278 |
| 2011/0231320 A1* | 9/2011 | Irving | 705/80 |
| 2012/0158203 A1* | 6/2012 | Feldstein | 700/295 |

* cited by examiner

SYSTEM AND METHOD FOR MANAGING POWER CONSUMPTION

CROSS-REFERENCE TO RELATED APPLICATION

This application claims priority under 35 U.S.C. §119(e) to U.S. Provisional Application Ser. No. 61/494,069 filed Jun. 7, 2011, which is hereby incorporated by reference in its entirety.

TECHNICAL FIELD OF THE INVENTION

This invention relates in general to a system and method for managing power consumption.

BACKGROUND OF THE INVENTION

Various industries are striving to find solutions to reduce energy bills despite increasing electricity rates. Demand Response (DR) is one such method. DR works to reduce the amount of power consumed during peak load times when power is most expensive. DR systems help utility companies avoid blackouts, defer construction of new generation/transmission facilities, and reduce costs. For consumers, DR systems help reduce electricity bills by reducing the amount of power consumed during the more costly peak time periods.

In many cases, office buildings are considered as a single consumer from the perspective of the utility company. The building owners typically provide a comprehensive electricity service to their tenants who pay a fixed fee for the administration and energy service. The electricity programs for office buildings may often include both energy consumption charges (e.g., the energy rate (cost per kilowatt hour)*power consumption) and demand charges (e.g., based on the peak load (in unit of kW) within a billing period). Thus, the more energy that is used during the peak hours, the greater the electricity bill is for the building.

SUMMARY

In accordance with a particular embodiment, a method for managing power consumption includes receiving power rate information and receiving power usage information. The method also includes receiving a plurality of personal preference profiles. Each personal preference profile of the plurality of personal preference profiles is associated with a different user of a plurality of users and includes at least one preferred state associated with a respective user. The method further includes detecting a presence of at least one user within a room. The method additionally includes adjusting at least one state associated with the room based on the at least one preferred state associated with the at least one user within the room, the power rate information, and the power usage information.

Technical advantages of particular embodiments may include providing power management based on the presence and/or preferred states of one or more users within a room of a building. The preferred states may be based on temperature or illumination preferences for individual users. Managing power consumption based on the presence and/or preferred states of one or more users within a room may allow a business entity to reduce their power bill and decrease their environmental impact. Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
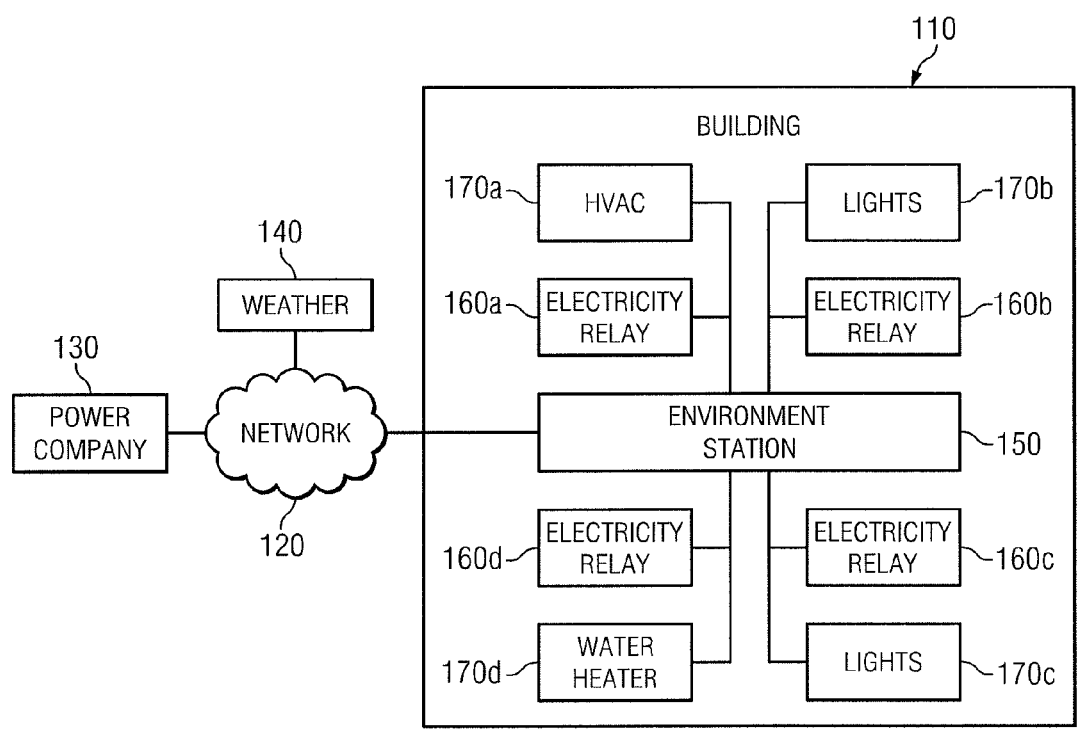
FIG. 1 illustrates a power consumption management system, in accordance with particular embodiments.

FIG. 1 illustrates a power consumption management system, in accordance with particular embodiments. The business entity (e.g., the owner) responsible for managing building 110 may install environment station 150 to help manage the power consumption of building 110. Environment station 150 may help to reduce the power bill for building 110. Environment station 150 may leverage existing information technology resources of the business (e.g., networking resources) entity to allow the business entity to control or manage its power consumption without having to rely on the utility company or a third party service provider to control the business entity's power consumption. In doing so, environment station 150 may consider the location (e.g., presence) and/or preferred states of one or more users within the building. The presence and preferred state information may be used by environment station 150 along with the demand rate, the current power usage, the energy rate, and/or the peak usage to determine, adjust, and/or set one or more states associated with one or more rooms within the building.

Building 110 may be an office building, a commercial building, an industrial building, a warehouse building, a residential building, a factory, multiple buildings within a single campus, or any other configuration in which it may be suitable to have one or more environment stations 150 manage the power consumption associated with one or more rooms within building 110. Regardless of the configuration of building 110, it may comprise a number of rooms that each may have one or more states that environment station 150 may be able to control (e.g., via one or more electricity relays 160). This may allow environment station 150 to manage the power consumption associated with the rooms. For example, environment station 150 may adjust the illumination of one or more lights within a room. As another example, environment station 150 may adjust the temperature associated with a room. As another example, environment station 150 may turn-off one or more devices associated with an empty room.

Environment station 150 may include any combination of hardware, software embedded in a computer readable medium, and/or encoded logic incorporated in hardware or otherwise stored (e.g., firmware) to implement any number of functions to manage the consumption of power by various rooms within building 110. In certain embodiments, environment station 150 may implement its power consumption management so as to minimize the impact on normal office operations and/or set one or more room states to be consistent with as many preferred states as reasonably feasible. For example, environment station 150 may average the preferred states of any users within the respective room.

In FIG. 1, building 110 is connected to network 120. Network 120 may be any network or combination of networks capable of transmitting signals, data, and/or messages, including signals, data or messages transmitted through WebPages, e-mail, text chat, voice over IP (VoIP), and instant messaging. Network 120 may include one or more LANs, WANs, MANs, PSTNs, WiMAX networks, global distributed networks such as the Internet, Intranet, Extranet, or any other form of wireless or wired networking. Network 120 may use any of a variety of protocols for either wired or wireless communication.

In certain embodiments, network 120 may connect environment station 150 with power company 130 and weather information provider 140. Information provided by power company 130 and weather information provider 140 may be collected, processed, and/or distributed (e.g., distributed among electricity relays 160) in order to provide power management for devices 170. Depending on the embodiment and/or scenario, power company 130 may provide environment station 150 with information such as the current energy rate, the current demand rate, any special or given circumstances (e.g., special demand response rates), or any other information (e.g., prior peak loads, current power consumption, etc.) which may be helpful to environment station 150 in managing the power consumption of building 110.

As used herein, the power rate may be used to generally refer to the information provided by the power company regarding the cost of power. Depending on the power company, the power rate may include an energy rate (e.g., the cost per kilowatt hour), a demand rate (e.g., the cost per kilowatt based on the peak load within a given period, such as a billing period), and/or any other rates or information that may impact the cost of power. Depending on the embodiment and/or scenario, weather information provider 140 may provide environment station 150 with information such as the current temperature, forecasted temperature, or any other information (e.g., historical weather information for the same day or substantially the same time, etc.) which may be helpful to environment station 150 in managing the power consumption of building 110.

Depending on the configuration of the power management system, environment station 150 may provide power management in a centralized, distributed, or hybrid configuration. The type of configuration may be a balance between communication overhead (between environment station 150 and electricity relays 160) and the amount of control that is desired.

In a centralized configuration, environment station 150 may receive information from power company 130 (e.g., energy rate, demand rate, etc.) and from weather information provider 140 (e.g., current temperature, forecasted temperature, etc.). Environment station 150 may also receive information from electricity relays 160. The information from electricity relays 160 may comprise the amount of power consumed by the associated device 170 (e.g., electricity relay 160*d* may provide information regarding the power consumed by device 170*d*), the current state of the associated device (e.g., whether a light is on or off, the temperature of the water of a water heater or the state of charge of a battery of a laptop, etc.), the number and/or identity of any users within a room, commands or requests provided by the users in the room, or any other information which may be helpful to environment station 150 in managing the power consumption of devices 170. Environment station 150 may also receive information regarding power consumed by other devices or components within building 110. Environment station 150 may also receive one or more personal preference profiles. Each personal preference profile may include one or more preferred states associated with a particular user. Based on the received information, environment station 150 may adjust one or more states associated with one or more devices within one or more rooms. Environment station 150 may then send messages to the individual electricity relays 160 indicating how the state associated with the room is to be changed or modified. This configuration may provide a higher level of control, and thus may provide better power reductions, but may require more signaling overhead between components.

In a distributed configuration, environment station 150 may provide electricity relays 160 with information regarding the amount of power being used by building 110 (e.g., based on devices 170 and/or other devices within building 110). Environment station 150 may also provide electricity relays 160 with a power rate associated with a cost of power. The power rate may be provided, directly or indirectly, by power company 130 and may vary over time. In some embodiments, environment station 150 may also provide electricity relays 160 with weather information. Electricity relays 160 may also receive a message regarding, or may otherwise determine, a state associated with a corresponding device 170 and/or a corresponding room (e.g., a temperature, an illumination level, etc.). Electricity relays 160 may also be able to determine the identity and/or preferred states (e.g., via the users' personal preference profiles) of any users within the corresponding room. Based on at least the above information, each electricity relay 160 may make its own determination, independent of the other electricity relays 160, as to how to adjust one or more states of the respective room. In this configuration, there is a relatively low amount of overhead because environment station 150 only provides the power usage and power rate information (and in some embodiments, weather information). In some scenarios, the electricity relays send very little, or no, information to the environment station 150. On the other hand, because each electricity relay 160 is independently making its own decision, environment station 150 may have relatively little control over how building 110 consumes power.

In a hybrid configuration, environment station 150 may receive power rate information from power company 130 and weather information from weather information provider 140. Environment station 150 may use the information along with one or more control parameters received from an operator (e.g., a system or building administrator responsible for managing the energy consumption of building 110) to generate one or more threshold values. Environment station 150 may transmit the one or more thresholds to electricity relays 160. Electricity relays 160 may assess a state associated with the corresponding device 170 and/or a state associated with the room and compare one or both states with the received thresholds to determine if, when, and/or how to adjust the state associated with the room and/or device (e.g., adjusting the amount of power flowing to the device). For example, in some embodiments, environment station 150 may determine two thresholds related to the temperature of room. If the state of the corresponding room is above an upper threshold, electricity relay 160 may allow power to flow to the corresponding device 170 to cool down the room; if the state is below a lower threshold, electricity relay 160 may stop the flow of power to the corresponding device 170 to allow the room to heat-up; and if the state is between the two thresholds, electricity relay 160 may stop the flow of power to the corresponding device 170 and/or may start a back-off timer before resuming the flow of power to the corresponding device 170. Each electricity relay 160 may use a different or random length back-off timer to help reduce the number of devices 170 that begin receiving power at the same time.

In a hybrid configuration, environment station 150 may have greater control over the power consumption of devices 170 than in the distributed configuration because the environment station 150 may adjust the various thresholds to affect the power consumption of building 110. However, it may not have the same level of control as the centralized configuration because environment station 150 may not send individual commands to individual electricity relays. The hybrid configuration may also have a lower overhead than the centralized configuration because individual electricity relays 160 may not send information to environment station 150 nor may environment station 150 individually signal each electricity relay 160 when to stop and when to allow the flow of power to the corresponding device 170. However, as discussed above, the hybrid configuration may not provide the same level of control as the centralized configuration.

Depending on the type of device 170 and/or the control scheme used by environment station 150 and/or electricity relays 160, the management of power consumption may include, for example, lowering the brightness of lights, signs, or display devices; turning off lights, signs or display devices, allowing the temperature of a room to rise; reducing the amount of power provided to an HVAC unit to allow the HVAC unit to provide cool air that is not quite as cool as if the HVAC unit was able to receive full power; or any other suitable action which may adjust a state associated with a room.

In certain embodiments, an operator responsible for managing the power consumption of building 110 may adjust one or more control parameters to modify the various thresholds. This may provide the operator with the ability to control the level of conservation with which environment station 150 manages power consumption for building 110. The control parameters may be adjusted in any of the configurations. In the distributed configuration, environment station 150 may distribute any adjustments to the control parameter to electricity relays 160.

In certain embodiments, the threshold values used in any of the configurations may also be adjusted in a dynamic manner based on the peak load and/or the current load. For example, in some instances, power company 130 may base the power rate on the time that the power is consumed as well as the peak load consumed by building 110 during a particular cycle, such as a billing cycle. An increase in the peak load of power consumed by the building may cause an increase in the demand rate. In some embodiments, the demand rate may be divided into different levels, each level associated with a range of peak load consumption and having a corresponding charge. In such an instance, environment station 150 may attempt to control power consumption to avoid rising into the next higher level. In some embodiments, environment station 150 (and/or electricity relays 160) may attempt to limit the power consumption by adjusting one or more thresholds so as to limit the amount of power that is consumed at a particular time. In certain embodiments, the threshold may be reduced quickly as the power consumption reaches a peak load (e.g., a previous peak load within the same current cycle). Then, as the current load decreases, power station 150 may gradually increase the threshold back up.

Devices 170 may comprise any of a variety of different types of devices that have controllable power consumption. The depicted devices include HVAC device 170a, lights 170b and 170c, and water heater 170d. The energy may be controlled in any of a variety of different ways. For example, lights may be turned off or dimmed. As another example, the temperature of HVAC units may be turned up or down or a cycle may be delayed. Because the power consumption of devices 170 is controllable, building 110 may continue to function within acceptable parameters even though full power may not be flowing to some of the corresponding devices 170. For example, based on the preferred states of any users in a room, environment station 150 may dim one or more lights within the room. The dimmed light may consume less power, than a light that is turned on at full brightness.

Although particular devices 170 have been depicted, in particular embodiments, environment station 150 may control the flow of power to any of a variety of different devices. For example, environment station 150 may, based on one or more preferred profiles, control the flow of power to ceiling fans, signs, fountains, music/sound systems, computers, or any other device which may receive a variable amount of power or which may be turned off without negatively impacting the operations of the building. In some embodiments, devices 170 may include the logic used to control the flow of power. For example, electricity relay 160c may be integrated into a light socket of a fixture for light 170c.

Electricity relays 160 may include any combination of hardware, software embedded in a computer readable medium, and/or encoded logic incorporated in hardware or otherwise stored (e.g., firmware) to implement any number of functions that allow electricity relays 160 to control the flow of power to their associated devices 170. Electrify relays 160 may, in some embodiments, be controllers able to provide varying levels of power to their associated devices 170. Electricity relays 160 may be able to communicate with environment station 150 and a corresponding device 170. The flow of power may be based on information or requests provided by environment station 150. The information provided may vary depending upon the configuration of environment station 150 and electricity relays 160. In some embodiments, electricity relays 160 may also receive one or more personal preference profiles or preferred states. The preferred states may be used locally by the appropriate electricity relay 160 and/or it may be communicated to environment station 150.

Depending upon device 170, electricity relay 160 may be an external component or an internal component to the corresponding device 170. For example, electricity relay 160a may be an external component to HVAC 170a, such as a standalone device functionally located between a power source and HVAC 170a. Alternatively, electricity relay 160a may be integrated into a thermostat associated with HVAC 170a. As another example, electricity relay 160b may be a standalone device, integrated into an outlet, light socket, powerstrip, or otherwise electrically positioned between a power source and lights 170b.

In some embodiments, electricity relay 160 may control the flow of power based on information provided by the corresponding device 170. For example, the corresponding device 170 may provide electricity relay 160 with information regarding the state of the device. For example, a water heater may provide a corresponding electricity relay with the state of the temperature of the water within the water heater. In some embodiments, electricity relay 160 may control the flow of power based on information provided by one or more sensors, such as thermometers, light meters, or any other sensor capable of measuring a state associated within a room. Electricity relays 160 may also control the flow of power based on one or more preferred states. For example, if the only users in the building at a particular time prefer cooler "hot water" when it is warm outside and warmer "hot water" when it is cool outside, then electricity relay 160 may adjust the temperature of the water heater accordingly.

Power company 130 may be a utility company responsible for providing electrical power for one or more buildings, such as building 110. Power company 130 may charge building 110 for the power it consumes on a dynamic basis. For example, depending on the time of day, the energy rate (e.g., the cost per kilowatt hour) may vary. The power rate charged to building 110 may also vary depending on the demand rate (e.g., the cost per kilowatt during peak demand). For example, the higher the highest peak is within a billing cycle, the higher the demand rate is for that billing cycle. In some instances, the power rate may vary depending on the demand placed on the utility company by multiple buildings. That is, as more electricity is being consumed, the rate for electricity may increase. As another example, the rate may increase as the amount of power being produced decreases. For example, where a power company uses windmills to generate power, the power may be more expensive on a non-windy day than on a windy day. Power company 130 may be able to communicate the power rate (energy rate and/or the demand rate) to environment station 150. The information may be communicated through, for example, network 120.

Weather information provider 140 may be able to provide environment station 150 with a variety of different types of weather information. For example, weather information provider 140 may provide current temperature, forecasted temperature, cloud cover, rain, or any other weather indicator which may be suitable for environment station 150 to consider in determining, or predicting, how to manage power consumption and/or when there might be a spike in load. For example, if the forecast is for a high temperature, environment station 150 may predict an increased HVAC load as building 110 runs the air conditioning to cool down building 110. Based on this determination, environment station 150 may, for example, lower one or more thresholds to decrease the brightness of lights 170b and 170c. Environment station 150 may also pre-heat, or pre-cool, building 110 in anticipation of a predicted spike in power consumption by building 110.

Although the embodiment depicted in FIG. 1 illustrates a particular number, type, and configuration of electricity relays and devices, other embodiments contemplate any number or arrangement of such components. For example, in some embodiments a single electricity relay may control the power for several lights within a room. In addition, the elements may include components centrally located (local) with respect to one another or distributed throughout building 110 and/or outside building 110.

Figure 2:
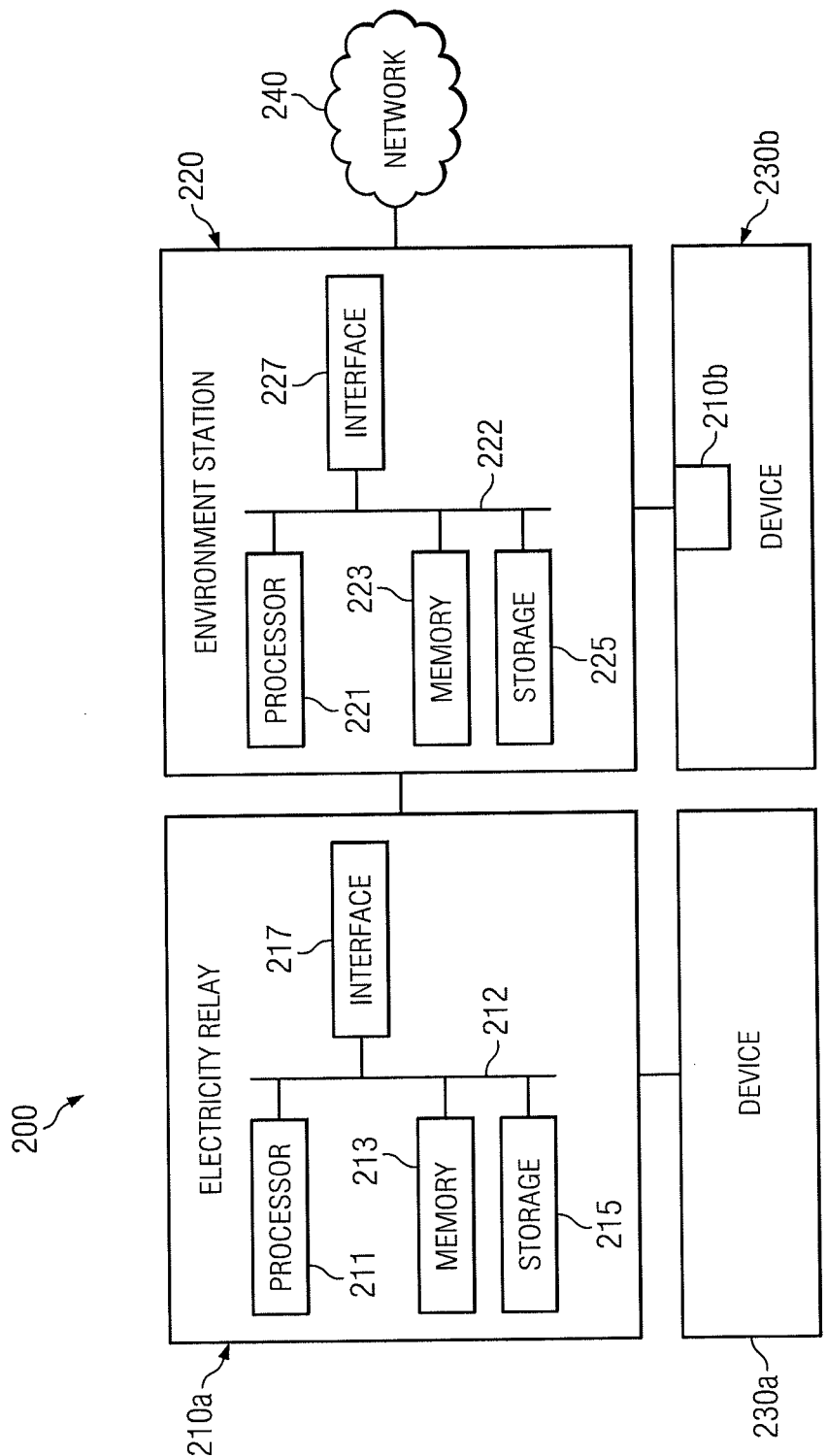
FIG. 2 illustrates a detailed block diagram of an electricity relay and an environment station in a power consumption management system, in accordance with particular embodiments.

FIG. 2 illustrates a detailed block diagram of an electricity relay and an environment station in a power consumption management system, in accordance with particular embodiments. Power consumption management system 200 may be used to manage power consumption based on users' preferred states for a variety of different devices including, but not limited to, lights, fans, HVAC units, or any other devices able to use a variable power flow or be shut off without negatively impacting one or more states associated with a room. Power consumption management system 200 includes electricity relays 210 and environment station 220. Electricity relays 210 may be external or internal to the corresponding device 230 to which electricity relays 210 control the flow of power. For example, electricity relay 210a is external to, and controls the flow of power to, device 230a and electricity relay 210b is internal to, and controls the flow of power to, device 230b.

Electricity relays 210 and environment station 220 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of electricity relays 210 and environment station 220 may comprise any suitable physical form, configuration, number, type and/or layout. As an example, and not by way of limitation, electricity relays 210 and/or environment station 220 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, electricity relays 210 and/or environment station 220 may include one or more computer systems; be unitary or distributed; span multiple locations; span multiple machines; or reside in a cloud, which may include one or more cloud components in one or more networks.

Where appropriate, one or more components of power consumption management system 200 may perform without substantial spatial or temporal limitation one or more steps of one or more methods described or illustrated herein. As an example, and not by way of limitation, power consumption management system 200 may perform in real time or in batch mode one or more steps of one or more methods described or illustrated herein. One or more power consumption management systems may perform at different times or at different locations one or more steps of one or more methods described or illustrated herein, where appropriate.

In the depicted embodiment, electricity relay 210a and environment station 220 each include their own respective processors 211 and 221, memory 213 and 223, storage 215 and 225, interfaces 217 and 227, and buses 212 and 222. These components may work together to manage a building's power consumption by managing the flow of power to one or more devices, such as devices 230, based on one or more preferred states associated with one more users. Although a particular power consumption management system is depicted having a particular number of particular components in a particular arrangement, this disclosure contemplates any suitable power consumption management system 200 having any suitable number of any suitable components in any suitable arrangement. For simplicity, similar components of electricity relay 210a and environment station 220 will be discussed together wherein the components of environment station 220 will be identified in parenthesis. However, it is not necessary for both devices to have the same components, or the same type of components. For example, processor 211 may be a general purpose microprocessor and processor 221 may be an application specific integrated circuit (ASIC).

Processor 211 (and/or 221) may be a microprocessor, controller, or any other suitable computing device, resource, or combination of hardware, software and/or encoded logic operable to provide, either alone or in conjunction with other components, (e.g., memory 213 or 223, respectively) power consumption management functionality. Such functionality may include resolving difference between the preferred states from different personal preference profiles for different users within the same room. The functions performed by the components of electricity relay 210 and environment station 220 may vary depending on the configuration of power consumption management system 200. For example, in a centralized configuration, processor 221 may determine how to adjust one or more states associated with a room based on the preferred states of the users therein. As another example, in a distributed configuration, processor 211 may determine how to adjust one or more states associated with a room based on the preferred states of the users therein. Additional examples and functionality provided, at least in part, by processor 211 (and/or 221) will be discussed below.

In particular embodiments, processor 211 (and/or 221) may include hardware for executing instructions, such as those making up a computer program. As an example and not by way of limitation, to execute instructions, processor 211 (and/or 221) may retrieve (or fetch) instructions from an internal register, an internal cache, memory 213 (and/or 223), or storage 215 (and/or 225); decode and execute them; and then write one or more results to an internal register, an internal cache, memory 213 (and/or 223), or storage 215 (and/or 225).

In particular embodiments, processor 211 (and/or 221) may include one or more internal caches for data, instructions, or addresses. This disclosure contemplates processor 211 (and/or 221) including any suitable number of any suitable internal caches, where appropriate. As an example and not by way of limitation, processor 211 (and/or 221) may include one or more instruction caches, one or more data caches, and one or more translation lookaside buffers (TLBs). Instructions in the instruction caches may be copies of instructions in memory 213 (and/or 223) or storage 215 (and/or 225) and the instruction caches may speed up retrieval of those instructions by processor 211 (and/or 221). Data in the data caches may be copies of data in memory 213 (and/or 223) or storage 215 (and/or 225) for instructions executing at processor 211 (and/or 221) to operate on; the results of previous instructions executed at processor 211 (and/or 221) for access by subsequent instructions executing at processor 211 (and/or 221), or for writing to memory 213 (and/or 223), or storage 215 (and/or 225); or other suitable data. The data caches may speed up read or write operations by processor 211 (and/or 221). The TLBs may speed up virtual-address translations for processor 211 (and/or 221). In particular embodiments, processor 211 (and/or 221) may include one or more internal registers for data, instructions, or addresses. Depending on the embodiment, processor 211 (and/or 221) may include any suitable number of any suitable internal registers, where appropriate. Where appropriate, processor 211 (and/or 221) may include one or more arithmetic logic units (ALUs); be a multi-core processor; include one or more processors 211 (and/or 221); or any other suitable processor.

Memory 213 (and/or 223) may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 (and/or 223) may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 (and/or 223) may include one or more memories 213 (and/or 223), where appropriate. Memory 213 (and/or 223) may store any suitable data or information utilized by electricity relay 210a (and/or environment station 220), including software embedded in a computer readable medium, and/or encoded logic incorporated in hardware or otherwise stored (e.g., firmware). In particular embodiments, memory 213 (and/or 223) may include main memory for storing instructions for processor 211 (and/or 221) to execute or data for processor 211 (and/or 221) to operate on. In particular embodiments, one or more memory management units (MMUs) may reside between processor 211 (and/or 221) and memory 213 (and/or 223) and facilitate accesses to memory 213 (and/or 223) requested by processor 211 (and/or 221).

As an example and not by way of limitation, electricity relay 210 may load instructions from storage 215 (and/or 225) or another source (such as, for example, another computer system) to memory 213 (and/or 223). Processor 211 (and/or 221) may then load the instructions from memory 213 (and/or 223) to an internal register or internal cache. To execute the instructions, processor 211 (and/or 221) may retrieve the instructions from the internal register or internal cache and decode them. During or after execution of the instructions, processor 211 (and/or 221) may write one or more results (which may be intermediate or final results) to the internal register or internal cache. Processor 211 (and/or 221) may then write one or more of those results to memory 213 (and/or 223). In particular embodiments, processor 211 (and/or 221) may execute instructions in one or more internal registers or internal caches or in memory 213 (and/or 223) (as opposed to storage 215 (and/or 225) or elsewhere) and may operate on data in one or more internal registers or internal caches or in memory 213 (and/or 223) (as opposed to storage 215 (and/or 225) or elsewhere).

In particular embodiments, storage 215 (and/or 225) may include mass storage for data or instructions. As an example and not by way of limitation, storage 215 (and/or 225) may include a hard disk drive (HDD), a floppy disk drive, flash memory, an optical disc, a magneto-optical disc, magnetic tape, or a Universal Serial Bus (USB) drive or a combination of two or more of these. Storage 215 (and/or 225) may include removable or non-removable (or fixed) media, where appropriate. Storage 215 (and/or 225) may be internal or external to electricity relay 210 (and/or environment station 220), where appropriate. In particular embodiments, storage 215 (and/or 225) may be non-volatile, solid-state memory. In particular embodiments, storage 215 (and/or 225) may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 (and/or 225) may take any suitable physical form and may comprise any suitable number or type of storage. Storage 215 (and/or 225) may include one or more storage control units facilitating communication between processor 211 (and/or 221) and storage 215 (and/or 225), where appropriate.

In particular embodiments, interface 217 (and/or 227) may include hardware, encoded software, or both providing one or more interfaces for communication (such as, for example, packet-based communication) between electricity relay 210a, environment station 220, device 230a, any networks, any network devices, and/or any other computer systems. As an example and not by way of limitation, communication interface 217 (and/or 227) may include a network interface controller (NIC) or network adapter for communicating with an Ethernet or other wire-based network and/or a wireless NIC (WNIC) or wireless adapter for communicating with a wireless network.

Depending on the embodiment, interface 217 (and/or 227) may be any type of interface suitable for any type of network in which the components of power consumption management system 200 may be used. As an example, and not by way of limitation, the components of power consumption management system 200 may communicate with one another in an ad-hoc network, a personal area network (PAN), a local area network (LAN), a wide area network (WAN), a metropolitan area network (MAN), or through one or more portions of the Internet or a combination of two or more of these. One or more portions of one or more of these networks may be wired or wireless. One or more portions of one or more of these networks may use a proprietary protocol. For example, electricity relays 210 and environment station 220 may use a proprietary and/or ad-hoc protocol to communicate information amongst one another. The components of power consumption management system 200 may communicate with a wireless PAN (WPAN) (such as, for example, a BLUETOOTH WPAN or a ZIGBEE WPAN), a Wi-Fi network, a WI-MAX network, an LTE network, an LTE-A network, a cellular telephone network (such as, for example, a Global System for Mobile Communications (GSM) network), or any other suitable wireless network or a combination of two or more of these. Electricity relay 210 (and/or environment station 220) may include any suitable interface 217 (and/or 227) for any one or more of these networks, where appropriate.

In some embodiments, interface 217 (and/or 227) may include one or more interfaces for one or more I/O devices. One or more of these I/O devices may enable communication between a person and electricity relay 210 (and/or environment station 220). As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 (and/or 227) for them. Where appropriate, interface 117 (and/or 227) may include one or more drivers enabling processor 211 (and/or 221) to drive one or more of these I/O devices. Interface 117 (and/or 227) may include one or more interfaces 117 (and/or 227), where appropriate.

Bus 212 (and/or 222) may include any combination of hardware, software embedded in a computer readable medium, and/or encoded logic incorporated in hardware or otherwise stored (e.g., firmware) to couple components of electricity relay 210 (and/or environment station 220) to each other. As an example and not by way of limitation, bus 212 (and/or 222) may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 (and/or 222) may include any number, type, and/or configuration of buses 212 (and/or 222), where appropriate. In particular embodiments, one or more buses 212 (which may each include an address bus and a data bus) may couple processor 211 (and/or 221) to memory 213 (and/or 223). Bus 212 (and/or 222) may include one or more memory buses.

Herein, reference to a computer-readable storage medium encompasses one or more tangible and non-transitory computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage medium implements one or more portions of processor 211 (and/or 221) (such as, for example, one or more internal registers or caches), one or more portions of memory 213 (and/or 223), one or more portions of storage 215 (and/or 225), or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The following explanation may provide additional detail as to some of the components and features of power consumption management system 200. The illustrated components of power consumption management system 200 may allow an owner or manager of a building, campus, or business (generally referred to as a building) to build and/or operate their own power consumption management system within their building. The system may be built to take advantage of infrastructure, such as any wireless or wired networking infrastructure, existing prior to the building of power consumption management system 200. In particular embodiments, the power demand of devices 230 may be considered as a value which may be controlled by environment station 220 and/or electricity relay 210 based on information from one or more personal preference profiles associated with one or more users within a particular room (e.g., a room controlled by electricity relay 210*a*).

The control may be implemented through environment station 220 and electricity relays 210 located within the building. The flow of power may be controlled to limit the power used by the controlled devices when other heavy loads (e.g. the air conditioning) are consuming power, or during peak hours when the power rate is high. In some embodiments, the management may involve increasing or decreasing the brightness of a room, lowering or raising a temperature, selectively allowing power to flow to devices to avoid having power flow to all the devices simultaneously, deferring the flow of power until after peak hours, reducing the amount of power that flows to devices, or a combination of any of the above.

Power consumption management system 200 may be arranged in a variety of configurations including a distributed configuration, a centralized configuration, and a hybrid configuration. The different configurations may represent a balance between the amount of control over the devices and the amount of signaling overhead.

In a distributed configuration, interface 227 of environment station 220 may periodically announce (e.g., broadcast over a LAN) overall building power usage (e.g., in kW) and the aggregated power usage of devices 230 (e.g., via sub-meters associated with devices 230). Interface 217 of electricity relay 210*a* may receive the announcement from environment station 220 and pass this information to memory 213 or storage 215. Interface 217 may also receive power rate information and store it in memory 213 or storage 215. The power rate information may be received from a utility company via network 240 or it may be received from environment station 220. Also stored in memory 213 or storage 215 may be the state (e.g., the brightness or temperature) associated with a room in which device 230*a* is located. Interface 217 may also receive one or more preferred states associated with one or more users that may be in the room. The preferred states may be maintained in a personal preference profile associated with each respective user. The personal preference profiles may also be stored in memory 213 or storage 215. In some embodiments, interface 217 may receive presence information for different users. The presence information may be used to determine whether a user is in a particular room. Processor 211 may then use the information stored in memory 213 or storage 215 to decide whether to stop, reduce, or allow power to flow to device 230*a*. A distributed configuration provides a simple configuration with low communication overheads but provides limited control over the actual consumption of power.

In one embodiment of a centralized configuration, interface 227 may periodically receive information regarding which users are in which rooms and the state associated with the rooms. This information may be received from devices 230, from sensors in the room, or from electricity relays 210. The state information may be stored in memory 223 or storage 225. Processor 221 may then use the state information, along with other information regarding the cost and usage of power, to determine how electricity relays 210 are to control the flow of power to devices 230. For example, processor 221 may determine which devices 230 are to receive more power and/or which devices 230 are to receive less power. Interface 227 may then transmit instructions to electricity relays 210 via interface 227. In some embodiments, interface 227 may send individual instructions to specific electricity relays 210 requesting that they allow or stop the flow of power. In some embodiments, interface 227 may broadcast a single message containing instructions for several, or all, electricity relays 210.

In certain embodiments, different operators or managers of different buildings may specify the aggressiveness with which power consumption management system 200 controls the states associated with the various rooms of a building. For example, some operators may wish that the state of a room be changed to use less power if the power rate (e.g., energy rate and/or demand rate) is above a certain threshold or if the power usage is above a certain threshold.

In a hybrid configuration, interface 227 of environment station 220 may receive the power rate information and power usage information. This information may be communicated to electricity relays 210. Processor 211 may use this information, along with any personal preference profiles for any users within the room associated with electricity relay 210*a*, to determine if and/or how to adjust the state of the room. In some embodiments, memory 213 and/or storage 215 may store several personal preference profiles. For example, the personal preference profile of each occupant of a building (e.g., that may have access to a relevant room) may be stored in the memory of each electricity relay 210. In other embodiments, electricity relay 210 may retrieve, and store in memory 213, the personal preference profiles for any users that are in the relevant room. In particular embodiments, the personal preference profiles may be stored in memory 223 and/or storage 225 of environment station 220. Presence information may then be sent by electricity relays 210 to environment station 220. Environment station 220 may then provide electricity relays 210 with the relevant personal preference profiles. A hybrid configuration may include a lower communication overhead than a centralized configuration but may result in less control.

In some embodiments, to avoid synchronized action among electricity relays 210, processor 211 may initiate a back-off timer before electricity relay 210*a* may stop and/or allow power to flow to device 230*a*. In some embodiments, the back-off time may comprise a random component to vary the amount of time.

In some embodiments, environment station 220 may try to limit the peak value of power consumed by the building within a control interval. This additional layer of control may be done in light of the preferred states of any users within the corresponding rooms. As the power consumed by the building approaches or surpasses a peak load (e.g. when air conditioning is turned on), environment station 220 may instruct one or more electricity relays to constrict or stop the flow of power to the corresponding devices. As the power consumed by the building drops below the peak value, environment station 220 may gradually instruct one or more electricity relays to increase the flow of power to the corresponding devices. In some embodiments, the decrease may be more dramatic than the increases. In such an embodiment, memory 223 or storage 225 may store a previously recorded peak load value (e.g., the highest peak of a previous interval or the highest peak so far within the current interval). Processor 221 may load this stored value and use it as an initial target peak load during the control interval. If the current power load consumed by the building exceeds the stored peak value, the stored peak value may be updated to reflect the current power load.

Environment station 220 may communicate with electricity relays 210 over any of a variety of different wired or wireless communication technologies and/or protocols. For example, the components may use a local area network, a fiber-optic network, an Ethernet network, a Wi-Fi network, a proprietary network used specifically by environment station 220 and electricity relays 210, or any other wired or wireless network or protocol.

Figure 3:
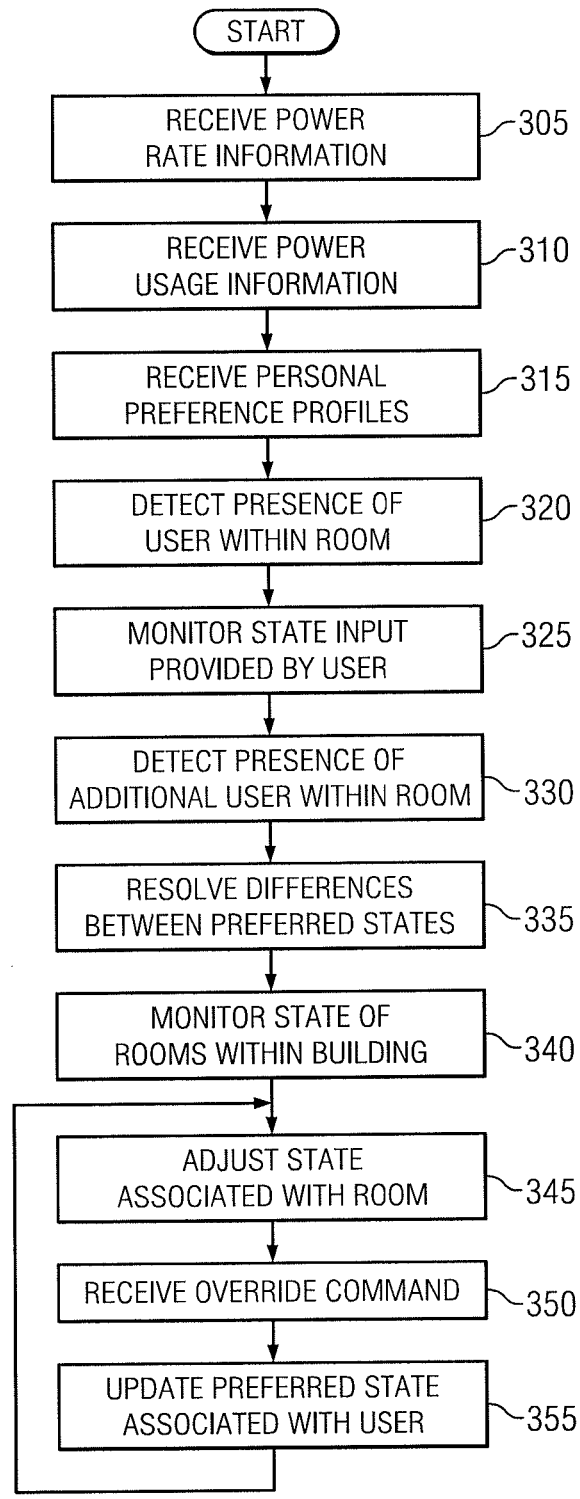
FIG. 3 illustrates a method for managing power consumption, in accordance with particular embodiments.

FIG. 3 illustrates a method for managing power consumption, in accordance with particular embodiments. The steps in the depicted method may include steps performed by an environment station, such as environment station 150 or 220, as well as steps performed by electricity relays, such as electricity relays 160 or 210. The electricity relays may be responsible for controlling the flow of power to a corresponding device. There may be several electricity relays within a building. In some embodiments, each electricity relay may operate independent of the other electricity relays. In some embodiments, the electricity relays may communicate amongst themselves to better manage the power consumption of the building. The device or devices for which each electricity relay controls the flow of power may comprise an appliance such as HVAC unit or a water heater, a light source, or any other device which is configured to operate using a variable supply of power. In some embodiments, the devices may be shared or used by more than one user.

The method begins at step 305 with the receipt of power rate information. The power rate information may be indicative of the cost associated with consuming power. The power rate information may be received from any of a variety of sources. For example, the power rate information may be received from a utility provider supplying a building with power, a third party service provider, a utility billing entity, a component within a building such as an environment station, or any source which may be able to determine or retrieve a power rate associated with the consumption of power. Power rate information may be received through any of a variety of different communication networks and/or protocols. For example, in some embodiments, the power rate information may be received via the Internet. The power rate may be associated with a cost of power from a power company. Depending an the power company, the power rate may comprise two different values. One value may be the energy rate which may comprise the monetary cost per kilowatt hour of power consumed by the devices within the building. A second value may be a demand rate which may be the monetary cost per kilowatt based on the peak amount of power consumed during a control interval, billing cycle, or some other period of time. That is, power may be more expensive for a building that consumed ten thousand kilowatts at its peak versus a building that consumed one thousand kilowatts at its peak. The power rate may vary over time based on any of a number of factors. For example, the power rate may increase as the power company experiences an increase in overall power consumption by its customers. As another example, the power company may increase the power rate when its source of energy is reduced (e.g., if the power company relies on wind power, on a non-windy day the power rate may be higher). As another example, the power rate may vary depending on the time of day and the amount of power consumed by the building. In some embodiments, the environment station may attempt to reduce the amount of power being used by the controlled devices so as to keep the peak demand usage low to avoid increasing the demand rate. In some embodiments, prior data stored in memory and/or storage may be used to determine or predict the power rate information.

At step 310 power usage information is received. The power usage information may be indicative of one or more amounts of power consumed by one or more devices and/or groups of devices (e.g., the lights in a room). The power usage information may be received from individual sub-meters associated with each of a plurality of different devices, from electricity relays, from a main meter associated with monitoring power consumption for the building, or any other source or device capable of determining the amount of power being consumed. In some embodiments, the power usage information may comprise a single amount of power being used by the building. In particular embodiments, the power usage information may include a plurality of different values (e.g., a different value for each of a plurality of different devices or groups of devices). In certain embodiments, the power usage information may be received from a number of electricity relays distributed throughout a building (e.g., a single building, multiple buildings, a campus, one or more offices of a business, etc.) for which the system may be controlling or managing the power consumption. In some embodiments, the electricity relays may also be able to adjust the amount of power that flows to the respective devices. In some embodiments, the power usage information may be used to determine whether the building is approaching or has surpassed a previous peak in power consumption. In some embodiments, the environment station may predict the power usage based on the usage information. For example, if the environment station receives a load message indicating that the air conditioning is about to turn on, the environment station may determine that a new peak value may be expected. In some embodiments, the environment station may receive weather information from a weather information provider, such as weather information provider 140. The information may forecast hot weather for the day. Based on this information the environment station may determine that it is going to be using an increased amount of power to run the HVAC unit and thus may be more aggressive in reducing the power used by the building lighting.

At step 315 personal preference profiles are received. The personal preference profiles may be received by the environment station and/or by the electricity relays. In some embodiments, the received personal preference profiles may be associated with the employees of one or more companies within a building.

Each personal preference profile may comprise at least one preferred state associated with a corresponding user. The preferred state within each personal preference profile may be associated with a preferred temperature, a preferred level of illumination, or any other parameter that may be used in managing power consumption and which is associated with a particular user. Any number of personal preference profiles may be received. In some embodiments, each user may have a single personal preference profile that may comprise multiple different preferred states (e.g., one personal preference profile having a preferred temperature state and a preferred light state). In certain embodiments, a single user may have multiple different personal preference profiles, each personal preference profile associated with the same user may be based on a different preferred state. In some embodiments, the preferred state may vary over time. For example, a user may specify that they prefer the room at a first temperature in the morning and in the afternoon they prefer a different temperature. In addition to one or more preferred states, each personal preference profile may also contain other information that may be useful in managing power consumption. For example, the personal preference profiles may include priority information associated with the user. The priority information may be used provide more or less weight to a particular user's preferred state.

In some embodiments, a user's personal preference profile may change as the environment station learns the habits and pretences of the user. For example, if a user repeatedly increases the brightness of a particular room, the environment station may learn that the user's default preferred state of illumination for the room is too dark and may adjust the default state for that room. This may allow the user's personal preference profile to adapt overtime without requiring the user to have to explicitly make changes to their personal preference profile.

At step 320 the presence of a user within a room is detected. The user's presence may be detected through any of a variety of different means. For example, in some embodiments, the user may have a device on their person that allows their presence to be detected. Such a device may include, for example, a radio frequency identification (RFID) tag. The RFID tag may be a part of a security key or security card used by the user to gain access to different rooms within the building. The presence of the user may also be detected from information provided by, for example, the user's smart phone. The system may also be able to detect the presence of the user based on the location of the computer at which the user is logged-in or based on keypad security entries made by the user.

At step 325 a state input provided by the user is monitored. A state input may include changes to the current state of a room and/or changes to a preferred state associated with the user. For example, the system may monitor when the user increases or decreases the temperature of a room. As another example, the system may monitor when the user increases or decreases the illumination level of a room. This state input information may be monitored, collected, and processed in order to better determine or modify a preferred state associated with a user. For example, the monitored state input may be used in order to update the preferred state associated with the user according to any of a variety of learning algorithms or techniques (e.g., via machine learning, a neural network, supervised learning, clustering, autoregression, support vector machine, Bayesian estimation, hidden markov model, reinforced learning, etc.). In some embodiments, the state information may be monitored to provide the building owner (or person responsible for the building's power consumption) with more detailed information about the energy consumption of individual users or groups of users within the building. In certain embodiments, when the system detects a state input provided by a user, the system may ask the user if the user wishes to update the preferred state based on the state input (e.g., change the preferred state to the state input). In some embodiments, over time, the environment station may learn the preferences of the users and may adjust each users' default preferred states. The environment station may then select the users' default preferred state without the user having to provide input.

At step 330, the system may detect the presence of additional users within the room. These additional users may be detected through similar means as those used to detect the presence of first user described with respect to step 320. Although in the depicted embodiment, step 330 follows step 320, the additional users may already be within the room when the user detected at step 320 enters the room.

At step 335 differences between the preferred states of the additional users within the room are resolved. The differences may be resolved to determine a single preferred state for the room based on the users within the room. The differences may be resolved in any of a variety of different ways. For example, the average or median preferred state of the users within the room may be determined. As another example, the system may determine a weighted average for the user within the room. The weighted average may be based on the relative rank or seniority of the users within the room. As another example, the differences may be resolved by using a value which is closest to the greatest number of users. For example, if three users within a room prefer that the room be 72 degrees and one users prefers that the room be 78 degrees, the system may set the room to be 72 degrees. In some embodiments, the system may query the users within the room to take a vote of what the preferred state of the room should be Particular embodiments may use a combination of two or more of the above techniques to resolve differences between the preferred states.

At step 340 one or more states of the different rooms within the building are monitored. The monitored states of the different rooms may be tracked, recorded, and processed in order to determine how to adjust the current state of the respective room. This may be done in coordination with the power rate and usage information (received at steps 305 and 310) as well as the preferred state resolved for the room (step 335). Monitoring the states of different rooms may allow the power consumption management system to limit the use of power in a more equitable fashion. For example, if one room within the building is several degrees warmer than the set temperature, then the system may be less likely to begin cooling a different room if the different room is a degree or two warmer than the current temperature. The system may also keep track of when the last time the state of the rooms has been adjusted. This may allow the system to rotate the activation of, for example, HVAC units to minimize the peak demand from the building. In some embodiments, monitoring the state associated with the rooms may include monitoring things such as the amount of natural light entering the room, the number of light sources that are receiving power, the temperature of the outside air entering the room, or any other factor that may impact the state of the room.

At step 345 the state associated with the room is adjusted. The adjustment may be based on a combination of the power rate information received at step 305, the power usage information received at step 310, the presence of users within a room detected at step 320, the resolved differences between the preferred states at step 335, and the state of the various rooms within the building monitored at step 340. Based on this information, the system may adjust, for example, the temperature or lighting within the room. In adjusting the state, the system may consider the difference between the current state and the resolved preferred state of the users within the room. The system may also consider how close the system is to approaching a peak load value when determining how to adjust the state of the room. For example, if the system or building is approaching a new peak load of power consumption, the system may decide not to brighten the room or cool the room at that particular time so as to reduce the amount by which, or likelihood that, the peak load of the building exceeds the peak load value. Similarly, the system may reduce the power consumption during times when the energy rate is at its highest.

At step 350 an override command is received. The override command may be received to override an adjustment made by the system to the state associated with the room. The override request may be received automatically (e.g., based on an operation mode of the device) or manually (e.g., based on a command entered by a user). For example, if the user wishes to darken the room to view a movie, or a presentation, the user may enter an override command requesting that the lights be dimmed. As another example, if the system dims the lights to conserve energy, and a user within the room needs bright light to examine a particular object, the user may enter an override command. As may be apparent, in many scenarios, the power consumption management system may operate without receiving any override commands. In some embodiments, the override command may be received from a user in response to a message sent by the power consumption management system alerting the user that the system is about to adjust the state of the room.

In some instances, at step 355 the preferred state associated with a user may be updated based on the received override command. As discussed above with respect to step 320, in which the input state provided by the user is monitored, the preferred state associated with the user may be updated over time as the system learns how the user adjusts the preferred state of a room.

Some of the steps illustrated in FIG. 3 may be combined, modified, or deleted where appropriate, and additional steps may also be added to any of the flowcharts. For example, the override command received at step 350 may be received before the state associated with the room is adjusted at step 345. As another example, the state of the room may be monitored on a continual basis. As another example, in some scenarios the user may be the only person within the room. In such a scenario, the method may skip from step 320 to step 340. As another example, the personal preference profile received at step 315 may, in some instances, be received prior to receiving power rate information at step 305 or power usage information at step 310. As yet another example, the state associated with the room may be adjusted more often than only after step 340. For example, when the system first detects the presence of a user within the room, the system may make an adjustment to the room. As additional users enter or leave the room, the system may further adjust the state associated with the room based on the presence of the additional users. The depicted method is a single iteration. In practice, the steps in FIG. 3 may be repeated in a continuous loop. Each loop that is repeated may comprise all or a subset of the steps illustrated in FIG. 3. Additionally, steps may be performed in any suitable order without departing from the scope of particular embodiments.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1 or FIG. 3, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within electricity relay 210 and environment station 220 such as a processor, memory, storage, an interface, and a bus, these elements may be combined, rearranged or positioned in order to accommodate particular power consumption management architectures or needs. In addition, any of these elements may be provided as separate external components to electricity relay 210, environment station 220, or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A method for managing power consumption, comprising:
   receiving power rate information;
   receiving power usage information;
   receiving a plurality of personal preference profiles, each personal preference profile of the plurality of personal preference profiles associated with a different user of a plurality of users and comprising at least one preferred state associated with a respective user;
   detecting a presence of at least one user within a room; and
   adjusting at least one state associated with the room based on the at least one preferred state associated with the at least one user within the room, the power rate information, and the power usage information.

2. The method of claim 1, wherein at least one personal preference profile comprises a preferred temperature.

3. The method of claim 1, wherein at least one personal preference profile comprises a preferred illumination.

4. The method of claim 1, further comprising:
   monitoring state input provided by the at least one user; and
   updating the at least one preferred state associated with the at least one user based on the monitored state input provided by the at least one user.

5. The method of claim 1, further comprising:
   detecting a presence of at least one additional user within the room;
   resolving any differences between the at least one preferred state associated with the at least one user within the room and at least one preferred state associated with the at least one additional user within the room; and
   adjusting at least one state associated with the room based on the resolved differences between the at least one preferred state associated with the at least one user within the room and the at least one preferred state associated with the at least one additional user within the room, the power rate information, and the power usage information.

6. The method of claim 1, further comprising:
   monitoring at least one state associated with a plurality of rooms within a building, the plurality of rooms comprising the room and at least one additional room; and
   adjusting at least one state associated with the room based on the at least one state associated with the plurality of rooms, the at least one preferred state associated with the at least one user within the room, the power rate information, and the power usage information.

7. The method of claim 1, further comprising receiving an override command from a mobile device of the at least one user within the room, the override command overriding the adjustment to the at least one state associated with the room.

8. A system for managing power consumption, comprising:
   an interface configured to:
     receive power rate information;
     receive power usage information; and
     receive a plurality of personal preference profiles, each personal preference profile of the plurality of personal preference profiles associated with a different user of a plurality of users and comprising at least one preferred state associated with a respective user;
   a processor coupled to the interface and configured to:
     detect a presence of at least one user within a room; and adjusting at least one state associated with the room based on the at least one preferred state associated with the at least one user within the room, the power rate information, and the power usage information.

9. The system of claim 8, wherein at least one personal preference profile comprises a preferred temperature.

10. The system of claim 8, wherein at least one personal preference profile comprises a preferred illumination.

11. The system of claim 8, wherein the processor is further configured to:
monitor state input provided by the at least one user; and
update the at least one preferred state associated with the at least one user based on the monitored state input provided by the at least one user.

12. The system of claim 8, wherein the processor is further configured to:
detect a presence of at least one additional user within the room;
resolve any differences between the at least one preferred state associated with the at least one user within the room and at least one preferred state associated with the at least one additional user within the room; and
adjust at least one state associated with the room based on the resolved differences between the at least one preferred state associated with the at least one user within the room and the at least one preferred state associated with the at least one additional user within the room, the power rate information, and the power usage information.

13. The system of claim 8, wherein the processor is further configured to:
monitor at least one state associated with a plurality of rooms within a building, the plurality of rooms comprising the room and at least one additional room; and
adjust at least one state associated with the room based on the at least one state associated with the plurality of rooms, the at least one preferred state associated with the at least one user within the room, the power rate information, and the power usage information.

14. The system of claim 8, wherein the interface is further configured to receive an override command from a mobile device of the at least one user within the room, the override command overriding the adjustment to the at least one state associated with the room.

15. A non-transitory computer readable medium comprising code, that when executed, is configured to:
receive power rate information;
receive power usage information;
receive a plurality of personal preference profiles, each personal preference profile of the plurality of personal preference profiles associated with a different user of a plurality of users and comprising at least one preferred state associated with a respective user;
detect a presence of at least one user within a room; and
adjust at least one state associated with the room based on the at least one preferred state associated with the at least one user within the room, the power rate information, and the power usage information.

16. The medium of claim 15, wherein at least one personal preference profile comprises a preferred temperature.

17. The medium of claim 15, wherein at least one personal preference profile comprises a preferred illumination.

18. The medium of claim 15, wherein the logic, when executed, is further configured to:
monitor state input provided by the at least one user; and
update the at least one preferred state associated with the at least one user based on the monitored state input provided by the at least one user.

19. The medium of claim 15, wherein the logic, when executed, is further configured to:
detect a presence of at least one additional user within the room;
resolve any differences between the at least one preferred state associated with the at least one user within the room and at least one preferred state associated with the at least one additional user within the room; and
adjust at least one state associated with the room based on the resolved differences between the at least one preferred state associated with the at least one user within the room and the at least one preferred state associated with the at least one additional user within the room, the power rate information, and the power usage information.

20. The medium of claim 15, wherein the logic, when executed, is further configured to:
monitor at least one state associated with a plurality of rooms within a building, the plurality of rooms comprising the room and at least one additional room; and
adjust at least one state associated with the room based on the at least one state associated with the plurality of rooms, the at least one preferred state associated with the at least one user within the room, the power rate information, and the power usage information.

21. The medium of claim 15, wherein the logic, when executed, is further configured to receive an override command from a mobile device of the at least one user within the room, the override command overriding the adjustment to the at least one state associated with the room.

* * * * *